United States Patent
Chon et al.

(10) Patent No.: US 11,626,723 B2
(45) Date of Patent: Apr. 11, 2023

(54) SYSTEM AND METHOD FOR PROTECTING INVERTER IN VEHICLE FROM OVERVOLTAGE

(71) Applicants: Hyundai Motor Company, Seoul (KR); Kia Motors Corporation, Seoul (KR)

(72) Inventors: Chae Duck Chon, Gyeonggi-do (KR); Nam Koo Han, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 310 days.

(21) Appl. No.: 17/037,235

(22) Filed: Sep. 29, 2020

(65) Prior Publication Data

US 2021/0313791 A1   Oct. 7, 2021

(30) Foreign Application Priority Data

Apr. 3, 2020   (KR) .................. 10-2020-0040624

(51) Int. Cl.
| | |
|---|---|
| *H02H 7/122* | (2006.01) |
| *B60L 3/00* | (2019.01) |
| *B60L 50/51* | (2019.01) |
| *B60L 7/14* | (2006.01) |
| *H02M 7/797* | (2006.01) |

(Continued)

(52) U.S. Cl.
CPC ........... *H02H 7/1222* (2013.01); *B60L 3/003* (2013.01); *B60L 7/14* (2013.01); *B60L 50/51* (2019.02); *H02M 1/0007* (2013.01); *H02H 7/122* (2013.01); *H02H 7/1227* (2013.01); *H02M 7/08* (2013.01); *H02M 7/797* (2013.01); *B60L 2210/40* (2013.01); *H02M 1/008* (2021.05); *H02M 7/81* (2013.01)

(58) Field of Classification Search
CPC ................................................... H02H 7/1222
See application file for complete search history.

(56) References Cited

U.S. PATENT DOCUMENTS

| | | | |
|---|---|---|---|
| 2017/0113680 A1* | 4/2017 | Shimizu | ................... B60L 50/64 |
| 2018/0278144 A1* | 9/2018 | Nakano | ................. H02M 7/797 |
| 2020/0036315 A1* | 1/2020 | Sato | ........................ B60K 6/547 |

FOREIGN PATENT DOCUMENTS

KR   2011-0105034 A   9/2011

* cited by examiner

*Primary Examiner* — Jared Fureman
*Assistant Examiner* — Christopher J Clark
(74) *Attorney, Agent, or Firm* — Fox Rothschild LLP

(57) ABSTRACT

A system for protecting a vehicle inverter from overvoltage includes a first inverter having switching elements and converting energy from an energy storage device into AC power. A first motor is driven by receiving the converted AC power. A second inverter is connected in parallel with the first inverter, includes a switching elements, and converts energy from the energy storage device into AC power. A second motor is driven by receiving the converted AC power. A first capacitor is connected in parallel between the first inverter and the energy storage device and stores electric energy of the first motor during regenerative braking. A controller turns off a relay connecting the energy storage device and the motor when a voltage of the first capacitor is equal to or greater than a predetermined voltage and operates the switching elements in the inverters in response to first and second current commands.

18 Claims, 9 Drawing Sheets

(51) Int. Cl.
*H02M 7/08* (2006.01)
*H02H 1/00* (2006.01)
*H02M 7/81* (2006.01)
*H02M 1/00* (2006.01)

SYSTEM AND METHOD FOR PROTECTING INVERTER IN VEHICLE FROM OVERVOLTAGE

CROSS-REFERENCE TO RELATED APPLICATION

This application claims the priority benefit of Korean Patent Application No. 10-2020-0040624, filed on Apr. 3, 2020 in the Korean Intellectual Property Office, the disclosure of which is incorporated herein by reference.

BACKGROUND

1. Field of the Disclosure

The present disclosure relates to a system and method for protecting an inverter in a vehicle from overvoltage.

2. Description of the Prior Art

In response to the recent crisis of air pollution and oil depletion, technologies related to eco-friendly vehicles that use electric energy as power for vehicles are actively being developed. Eco-friendly vehicles include hybrid electric vehicles, fuel cell electric vehicles, and electric vehicles.

As shown in FIG. 1 of the related art, an electric vehicle having a disconnector on the front wheel and two driving motors includes two inverter systems for driving the two motors. In such an electric vehicle, as the disconnector is released, a connection between the motor and a driving system is released, and a front wheel motor is in a no-load state. In particular, the electric energy of the front wheel motor generated as the front wheel motor diverges excessively flows toward a capacitor (not shown) connected in parallel with a front wheel inverter and thus, a direct current (DC) link voltage across the both ends of a capacitor designed in a front wheel inverter system rapidly increases. As a result, damage to the inverter occurs due to overvoltage. Accordingly, there is a need to develop a technology capable of preventing damage to the inverter due to the overvoltage.

The above descriptions as background art are merely for improving understanding of the background of the present disclosure, and should not be accepted as acknowledging that they correspond to the prior arts already known to those skilled in the art.

SUMMARY

The present disclosure provides a system and method for protecting an inverter in a vehicle from overvoltage, which prevent the inverter in the vehicle from being damaged by the overvoltage.

In accordance with an aspect of the present disclosure, a system for protecting an inverter in a vehicle from overvoltage may include: a first inverter having a plurality of switching elements and configured to convert energy provided from an energy storage device into alternating current (AC) power; a first motor configured to be driven by receiving the AC power converted by the first inverter; a second inverter connected in parallel with the first inverter, to include a plurality of switching elements, and configured to convert energy provided from the energy storage device into AC power; a second motor configured to be driven by receiving the AC power converted by the second inverter; a first capacitor connected in parallel between the first inverter and the energy storage device and configured to store electric energy of the first motor during regenerative braking; and a controller configured to turn off a relay connecting the energy storage device and the motor when a voltage of the first capacitor measured by a voltage sensor is equal to or greater than a predetermined first voltage and to operate the switching elements in the first inverter and the second inverter in response to first current commands $1\_Id^*$ and $1\_Iq^*$ causing a zero vector to be applied to each motor and second current commands $2\_Id^*$ and $2\_Iq^*$ causing a zero torque to be generated in each motor, the current commands being previously stored.

The controller may be configured to turn off the relay connecting the energy storage device and the first motor when the voltage of the first capacitor measured by the voltage sensor is equal to or greater than the predetermined first voltage, may operate the switching element in the first inverter in response to the first current commands $1\_Id^*$ and $1\_Iq^*$, and may operate the switching element in the second inverter in response to the second current commands $2\_Id^*$ and $2\_Iq^*$.

The system may further include: a second capacitor connected in parallel between the second inverter and the energy storage device and configured to store electric energy of the second motor during regenerative braking. The controller may be configured to turn off the relay connecting the energy storage device and the second motor when the voltage of the second capacitor measured by the voltage sensor is equal to or greater than a predetermined first voltage, operate the switching element in the first inverter in response to the second current commands $2\_Id^*$ and $2\_Iq^*$, and operate the switching element in the second inverter in response to the first current commands $1\_Id^*$ and $1\_Iq^*$.

The first inverter may include: a first leg having a first switching element and a second switching element positioned at a lower end of the first switching element; a second leg having a third switching element and a fourth switching element positioned at a lower end of the third switching element; and a third leg having a fifth switching element and a sixth switching element positioned at a lower end of the fifth switching element, and output ends of the first leg, the second leg, and the third leg may be connected to each phase of the first motor. The second inverter may include: a fourth leg having a seventh switching element and an eighth switching element positioned at a lower end of the seventh switching element; a fifth leg having a ninth switching element and a tenth switching element positioned at a lower end of the ninth switching element; and a sixth leg having an eleventh switching element and a twelfth switching element positioned at a lower end of the eleventh switching element, and output ends of the fourth leg the fifth leg and the sixth leg may be connected to each phase of the second motor.

When the plurality of switching elements are driven, the first current commands $1\_Id^*$ and $1\_Iq^*$ may cause the first switching element, the third switching element, and the fifth switching element, or the seventh switching element, the ninth switching element, and the eleventh switching element to be turned on, and thus, a zero vector may be applied to the first motor or the second motor during driving of the first motor or the second motor, thereby causing a negative torque to be generated in the first motor or the second motor. When the plurality of switching elements are driven in the first inverter and the second inverter, the second current commands $2\_Id^*$ and $2\_Iq^*$ may cause a zero torque to be generated in the first motor or the second motor.

The controller may include: a memory configured to store a first current command ($1\_Id^*$ or $1\_Iq^*$) map causing a zero vector to be applied to each motor during driving of each motor to enable a negative torque to be generated in each motor and a second current command (2_Id* or 2_Iq*) map causing a zero torque to be generated in each motor; an overvoltage detector configured to determine whether a voltage across both ends of each capacitor measured by the voltage sensor is equal to or greater than the first voltage; a current controller configured to generate first voltage commands 1_Vd* and 1_Vq* and second voltage commands 2_Vd* and 2_Vq* to enable a d-axis current Id and a q-axis current Iq fed back from each motor to follow a first d-axis current command 1_Id*, a first q-axis current command 1_Iq*, a second d-axis current command 2_Id*, and a second q-axis current command 2_Iq* which are stored in the memory; and a switching element controller configured to operate the switching elements in the first inverter and the second inverter in response to the generated first voltage commands and second voltage commands.

When a measured voltage across both ends of the first capacitor is equal to or greater than the first voltage, the controller may be configured to turn off the relay, cause a current provided from the first inverter to the first motor to follow the first current command and a current provided from the second inverter to the second motor to follow the second current command, or cause the current provided from the first inverter to the first motor to follow the second current command and the current provided from the second inverter to the second motor to follow the first current command.

When a measured voltage across both ends of the first capacitor is equal to or greater than the first voltage, the controller may be configured to turn off the relay, discharge the voltage of the first capacitor up to a predetermined second voltage, and then maintain the voltage of the first capacitor within an error range with respect to the second voltage. The controller may be configured to increase the voltage of the first capacitor through regenerative braking when the measured voltage across both ends of the first capacitor decreases below the error range with respect to the second voltage, and may be configured to discharge the voltage of the first capacitor through driving of the first motor when the voltage across both ends of the first capacitor exceeds the error range with respect to the second voltage.

In response to determining that the voltage of the first capacitor measured by the voltage sensor is equal to or greater than the predetermined first voltage, the controller may be configured to turn on the first switching element, the third switching element, and the fifth switching element, or turn on the second switching element, the fourth switching element, and the sixth switching element while turning off the relay connecting the energy storage device and the first motor, and may be configured to operate the switching element in the second inverter in response to the second current commands 2_Id* and 2_Iq*.

In response to determining that the voltage of the second capacitor measured by the voltage sensor is equal to or greater than the predetermined first voltage, the controller may be configured to turn on the seventh switching element, the ninth switching element, and the eleventh switching element, or turn on the eighth switching element, the tenth switching element, and the twelfth switching element while turning off the relay connecting the energy storage device and the motor, and may be configured to operate the switching element in the first inverter in response to the first current commands 1_Id* and 1_Iq*.

In accordance with an aspect of the present disclosure, a method for protecting an inverter in a vehicle from overvoltage may include: determining whether a voltage across both ends of a first capacitor measured by a voltage sensor is equal to or greater than a first voltage; turning off a relay connecting an energy storage device and a motor when the voltage across both ends of the first capacitor is equal to or greater than the first voltage; and operating switching elements in a first inverter and a second inverter in response to first current commands 1_Id* and 1_Iq* causing a zero vector to be applied to each motor and second current commands 2_Id* and 2_Iq* causing a zero torque to be generated in each motor.

Before determining whether a voltage across both ends of a first capacitor measured by a voltage sensor is equal to or greater than a first voltage, the method may include: storing, in a memory, a first current command (1_Id* or 1_Iq*) map causing a zero vector to be applied to each motor and a second current command (2_Id* or 2_Iq*) map causing a zero torque to be generated in each motor.

The operating switching elements in a first inverter and a second inverter in response to first current commands 1_Id* and 1_Iq* causing a zero vector to be applied to each motor and second current commands 2_Id* and 2_Iq* causing a zero torque to be generated in each motor may include: generating first voltage commands 1_Vd* and 1_Vq* and second voltage commands 2_Vd* and 2_Vq* to enable a d-axis current Id and a q-axis current Iq fed back from each motor in a current controller to follow a first d-axis current command 1_Id*, a first q-axis current command 1_Iq*, a second d-axis current command 2_Id*, and a second q-axis current command 2_Iq* which are stored in the memory; and operating the switching elements in the first inverter and the second inverter in response to the generated first voltage commands and second voltage commands.

After turning off of a relay connecting an energy storage device and a motor when the voltage across both ends of the first capacitor is equal to or greater than the first voltage, the method may include: discharging the voltage of the first capacitor up to a predetermined second voltage; and maintaining, by a switching element controller, the voltage of the first capacitor within an error range with respect to the second voltage.

In the maintaining the voltage of the first capacitor within an error range with respect to the second voltage, the controller may be configured to increase the voltage of the first capacitor through regenerative braking when the voltage across both ends of the first capacitor decreases below the error range with respect to the second voltage, and discharge the voltage of the first capacitor through driving of the first motor and the second motor when the voltage across both ends of the first capacitor exceeds the error range with respect to the second voltage.

After turning off of a relay connecting an energy storage device and a motor when the voltage across both ends of the first capacitor is equal to or greater than the first voltage, the method may include: turning on, by the controller, the first switching element, the third switching element, and the fifth switching element, or turning on the second switching element, the fourth switching element, and the sixth switching element; and operating the switching element in the second inverter in response to the second current commands 2_Id* and 2_Iq*.

According to the present disclosure, it may be possible to prevent an inverter in a vehicle from overvoltage. Further, it may be possible to increase the driving time of other electrical components by maintaining a DC link terminal voltage (e.g., voltage across both ends of the capacitor) in an inverter system at a constant voltage and providing the corresponding voltage to other electrical components in the vehicle.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a system and method for protecting an inverter in a vehicle from overvoltage according to an exemplary embodiment of the present disclosure will be described with reference to the accompanying drawings.

Figure 1:
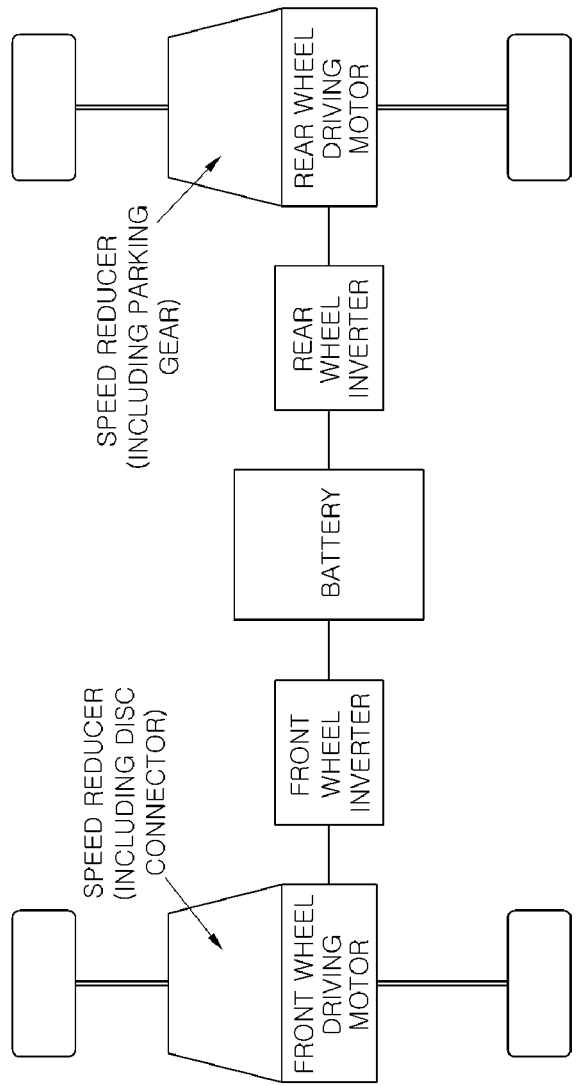
FIG. 1 is a view schematically showing an electric vehicle including two driving motors according to the related art.
Figure 2:
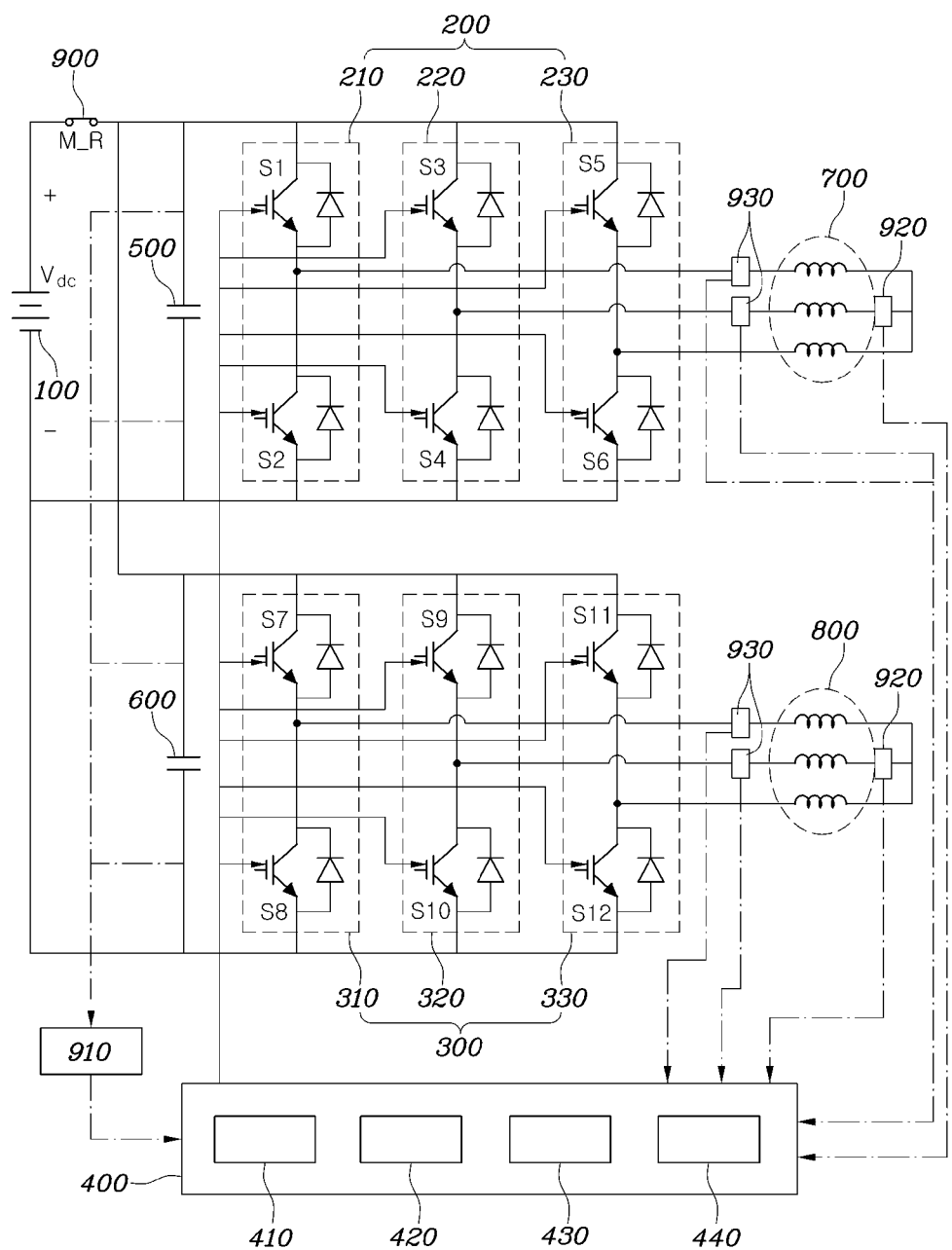
FIG. 2 is a view schematically showing a system for protecting an inverter in a vehicle from overvoltage according to an exemplary embodiment of the present disclosure.

A system for protecting an inverter in a vehicle from overvoltage according to the present disclosure may include a disconnector on a front wheel and two driving motors, and may protect an inverter in an electric vehicle including two inverter systems for driving the two motors from overvoltage. As shown in FIG. 2, the system for protecting an inverter in a vehicle from overvoltage according to the present disclosure may include an energy storage device 100, a first inverter 200, a second inverter 300, a controller 400, a first capacitor 500, a second capacitor 600, a first motor 700, a second motor 800, a relay 900, a voltage sensor 910, a rotation angle sensor 920, and a current sensor 930.

The energy storage device 100 may be configured to output direct current power as an element that stores electric energy for driving the first motor 700 and the second motor 800 in the form of direct current, such as a battery. The first capacitor 500 may be connected to both ends of the energy storage device 100 and may be connected in parallel between the first inverter 200 and the energy storage device 100 to be described later. In particular, the electric energy of the first motor 700 may be stored in the first capacitor 500 during regenerative braking to form a DC link voltage Vdc. The DC link voltage may be an input voltage of the first inverter 200.

The second capacitor 600 may be connected to both ends of the energy storage device 100 and may be connected in parallel between the second inverter 300 and the energy storage device 100 to be described later. In particular, the electric energy of the second motor 800 may be stored in the second capacitor 600 during regenerative braking to form a DC link voltage Vdc. The DC link voltage may be the input voltage of the second inverter 300.

The first inverter 200 may include a plurality of switching elements in which the on/off state may be adjusted by a pulse width modulated signal provided from the controller 400, and convert DC power provided from the energy storage device 100 into AC power for driving the first motor 700. Specifically, the first inverter 200 may include a first leg 210 having a first switching element S1 and a second switching element S2 disposed at the lower end of the first switching element S1, a second leg 220 having a third switching element S3 and a fourth switching element S4 disposed at the lower end of the third switching element S3, and a third leg 230 having a fifth switching element S5 and a sixth switching element S6 disposed at the lower end of the fifth switching element. The switching of the inverter 200 may be understood to refer to switching of a three-phase voltage output from the inverter. In addition, the output ends of the first leg 210, the second leg 220, and the third leg 230 may be connected to each phase of the first motor 700.

The second inverter 300 may include a plurality of switching elements in which the on/off state may be adjusted by a pulse width modulated signal provided from the controller 400, and may be configured to covert DC power provided from the energy storage device 100 into AC power for driving the second motor 800. The second inverter 300 may include a fourth leg 310 having a seventh switching element S7 and an eighth switching element S8 disposed at the lower end of the seventh switching element S7, a fifth leg 320 having a ninth switching element S9 and a tenth switching element S10 disposed at the lower end of the ninth switching element S9, and a sixth leg 330 having an eleventh switching element S11 and a twelfth switching element S12 disposed at the lower end of the eleventh switching element S11. In particular, the output ends of the fourth leg 310, the fifth leg 320, and the sixth leg 330 may be connected to each phase of the second motor 800.

The first motor 700 may be driven by receiving the AC power converted through the first inverter 200, and various types of motors known in the art may be employed as the first motor 700. In an eco-friendly vehicle, a motor may be referred to as a driving motor that provides rotational force to a driving wheel of the vehicle. In addition, the second motor 800 may be driven by receiving the AC power converted through the second inverter 300, and various types of motors known in the art may be employed as the second motor 800.

The voltage sensor 910 may be configured to measure a both-end voltage (e.g., a DC link voltage: Vdc) of the first capacitor 500 or the second capacitor 600, and information regarding the measured voltage across both ends of the capacitor may be transmitted to the controller 400 and may be used to determine whether overvoltage has occurred.

The rotation angle sensor 920 may be configured to detect the position of the rotor of each of the first motor 700 and the second motor 800, that is, the rotation angle of the rotor of each motor, and detect the angle of the rotor of each motor and continuously output a rotation angle detection signal including information on the detected rotation angle of the rotor. According to an exemplary embodiment, the rotation angle sensor 920 may be implemented as a resolver or the like.

The current sensor 930 may be configured to measure a current input from the first inverter 200 to the phase of the first motor 700 and a current input from the second inverter 300 to the phase of the second motor 800. According to an exemplary embodiment, when each of the first motor 700 and the second motor 800 is a three-phase motor having a, b, and c phases, two or more current sensors 930 may be provided to measure the current input to at least two of the a, b, and c phases.

The controller 400 may be configured to perform control of a pulse width modulation method to appropriately adjust the duty cycle (e.g., duty ratio) of the switching elements S1 to S12 of the first inverter 200 and the second inverter 300 to adjust the torque of each of the first motor 700 and the second motor 800 to a desired value (e.g., torque command).

For this control, when the voltage across both ends of the first capacitor 500 measured by the voltage sensor 910 is equal to or greater than a predetermined first voltage, the controller 400 may be configured to operate the switching elements S1 -S12 in the first inverter 200 and the second inverter 300, so that each of the first motor 700 and the second motor 800 may output a value corresponding to a torque command value (e.g., a torque target value to be obtained through each motor) for each motor input from the outside.

Specifically, the controller 400 may include: a memory 410 configured to store a first current command (1_Id* or 1_Iq*) map causing a zero vector to be applied to each motor during the driving of each motor to enable a negative torque to be generated in each motor, and a second current command (2_Id* or 2_Iq*) map causing a zero torque to be generated in each motor; an overvoltage detector 420 configured to determine whether the voltage across both ends of each capacitor measured by the voltage sensor is equal to or greater than a first voltage; a current controller 430 configured to generate first voltage commands 1_Vd* and 1_Vq* and second voltage commands 2_Vd* and 2_Vq* to enable a d-axis current Id and a q-axis current Iq fed back from each motor to follow a first d-axis current command 1_Id*, a first q-axis current command 1_Iq*, a second d-axis current command 2_Id*, and a second q-axis current command 2_Iq* which are stored in the memory 410; and a switching element controller 440 configured to operate the switching elements in the first inverter and the second inverter in response to the generated first voltage commands and second voltage commands.

In particular, the first current commands 1_Id* and 1_Iq* stored in the memory 410 are current command values in which a zero vector is applied to the first motor 700 or the second motor 800 during the driving of the first motor 700 or the second motor 800 to enable a negative torque to be generated in the first motor 700 or the second motor 800 by turning on the first switching element S1, the third switching element S3, and the fifth switching element S5 or the seventh switching element S7, the ninth switching element S9, and the eleventh switching element S11 when the plurality of switching elements are driven by the controller 400. The first current command may be a characteristic current value to enable a zero vector to be applied to each motor during the driving of each motor, and the current command value may have a different value for each motor.

In addition, the first current commands 1_Id* and 1_Iq* may be current commands in which a zero vector is applied to the first motor 700 or the second motor 800 during the driving of the first motor 700 or the second motor 800 to enable a negative torque to be generated in the first motor 700 or the second motor 800 by turning on the second switching element S2, the fourth switching element S4, and the sixth switching element S6 or the eighth switching element S8, the tenth switching element S10, and the twelfth switching element S12 when the plurality of switching elements are driven by the controller 400.

In other words, the first current commands 1_Id* and 1_Iq* stored in the memory 410 are command values in which a zero vector is applied to the motor during the driving of the motor to enable a negative torque to be generated in the motor. When the switching elements of the inverter are operated to enable a current input to the motor to follow the corresponding current command, a negative torque may be generated in the motor during the driving of the motor.

In addition, the second current commands 2_Id* and 2_Iq* stored in the memory 410 are current command values that cause a zero torque to be generated in the first motor 700 or the second motor 800 when the switching elements in the first inverter 200 or the second inverter 300 are driven by the controller 400. According to an exemplary embodiment, a second d-axis current command 2_Id* may be −10A, and a second q-axis current command 2_Iq* may be 0A In this manner, in response to a command in which the second d-axis current command 2_Id* is −10A and the second q-axis current command 2_Iq* is OA, a zero torque may be generated in the first motor 700 or the second motor 800 as the switching elements in the first inverter 200 or the second inverter 300 may be driven.

In other words, the second current commands 2_Id* and 2_Iq* stored in the memory 410 are command values that cause a zero torque to be generated in the motor. When the switching elements of the inverter are operated to enable a current input to the motor to follow the second current command, a zero torque may be generated in the motor. In addition, the controller 400 may further include a coordinate conversion unit configured to convert 2-phase coordinates to 3-phase coordinates or converts 3-phase coordinates to 2-phase coordinates. According to an exemplary embodiment, when the first motor 700 and the second motor 800 are three-phase motors having a, b, and c phases, the coordinate conversion unit may be configured to convert a d-axis current Id and a q-axis current Iq into three-phase currents Ia, Ib, and Ic of a, b, and c, or may be configured to convert the three-phase currents Ia, Ib, and Ic of a, b, and c into the d-axis current Id and the q-axis current Iq. The converting the two-phase coordinates into the three-phase coordinates or converting the three-phase coordinates into the two-phase coordinates is a well-known technique, and detailed description thereof will be omitted.

Figure 3:
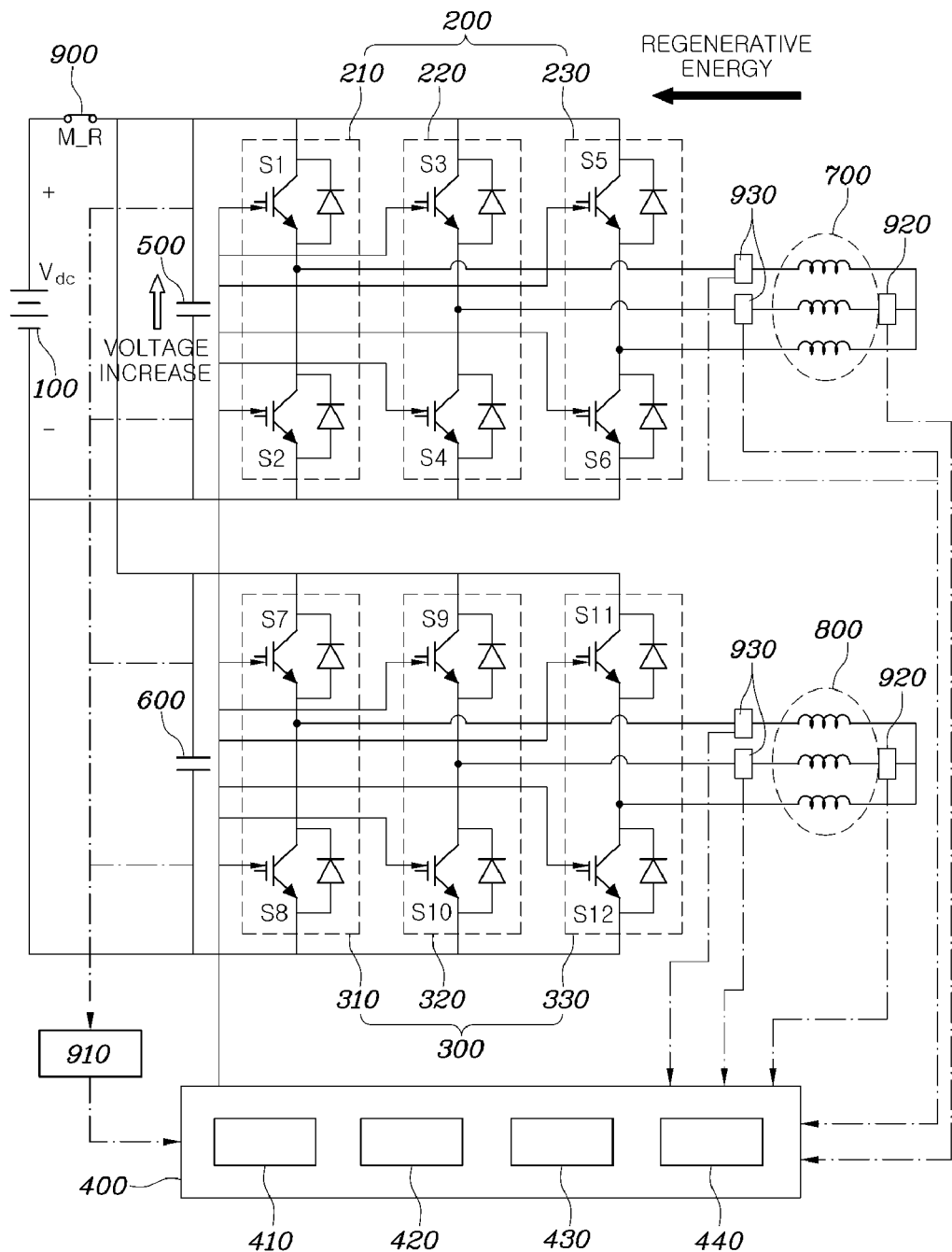
FIG. 3 is a view showing a system for protecting an inverter in a vehicle from overvoltage according to an exemplary embodiment of the present disclosure before a failure occurs.

Hereinafter, an operating principle of a system for protecting an inverter in a vehicle from overvoltage according to the present disclosure will be described with reference to FIGS. 3 to 7. In a normal state in which no failure has occurred as shown in FIG. 3, the electric energy of the first motor 700 may be charged in the first capacitor 500 during regenerative braking, to increase the voltage of the first capacitor 500. At this time, the voltage sensor 910 may be configured to measure the voltage across both ends of the first capacitor 500 and transmit the measured voltage across both ends of the first capacitor 500 to the controller 400, and the controller 400 may be configured to determine whether the voltage of the first capacitor 500 is equal to or greater than a predetermined first voltage. In particular, the first voltage is a value extracted by an experimental value and may be a voltage having a size capable of destroying the switching element included in the inverter.

Meanwhile, in FIG. 3 and the previous description, the first motor 700, the first inverter 200, and the first capacitor 500 have been mainly described, but the present disclosure may also be driven through the second motor 800, the second inverter 300, and the second capacitor 600. In other words, in a normal state in which no failure has occurred, the electric energy of the second motor 800 may be charged in the second capacitor 600 during regenerative braking, to increase the voltage of the second capacitor 600. At this time, the voltage sensor 910 may be configured to measure the voltage across both ends of the second capacitor 600 and transmit the measured voltage across both ends of the second capacitor 600 to the controller 400, and the controller 400 may be configured to determine whether the voltage of the second capacitor 600 is equal to or greater than a predetermined first voltage.

Figure 4:
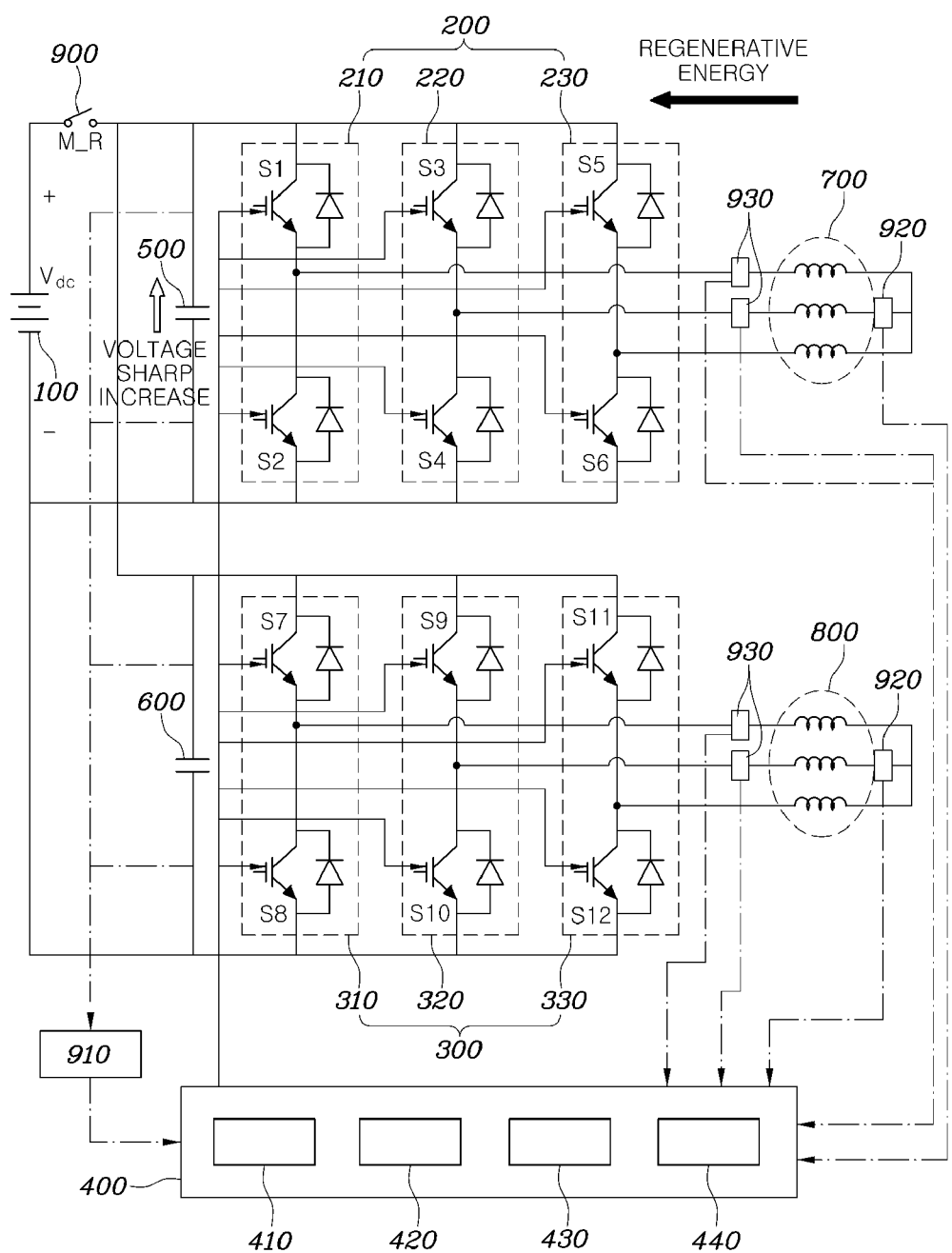
FIG. 4 is a view showing a situation in which a relay is turned off when a failure occurs in a system for protecting an inverter in a vehicle from overvoltage according to an exemplary embodiment of the present disclosure.
Figure 5:
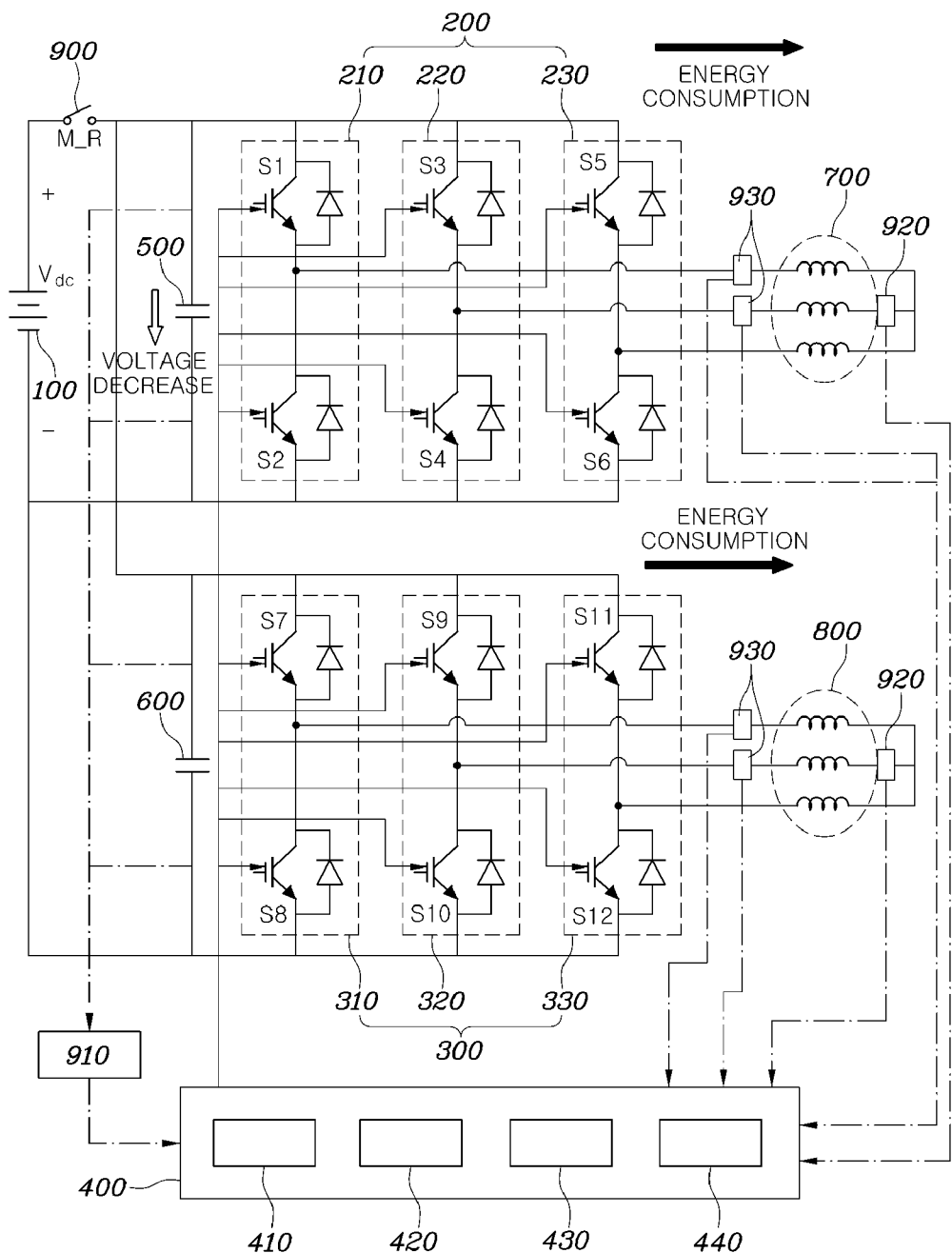
FIG. 5 is a view showing a situation in which a voltage of a first capacitor is discharged after a failure occurs in a system for protecting an inverter in a vehicle from overvoltage according to an exemplary embodiment of the present disclosure.

In response to determining that the voltage of the first capacitor 500 measured by the voltage sensor 910 is determined to be equal to or greater than the first voltage, the controller 400 may be configured to turn off the relay 900 connecting the energy storage device 100 and the first motor 700 as shown in FIG. 4. Meanwhile, after turning off the relay 900 connecting the energy storage device 100 and the first motor 700 as shown in FIG. 4, the voltage of the first capacitor 500 should be discharged by the controller 400 to prevent damage to the switching element in the first inverter 200. However, the voltage of the first capacitor 500 may be discharged by the controller 400 according to the present disclosure by operating the switching elements in the first inverter 200 and the second inverter 300 in response to the first current commands 1_Id* and 1_Iq* to enable a zero vector to be applied to each motor previously stored in the memory and the second current commands 2_Id* and 2_Iq* to enable a zero torque to be generated in each motor.

Specifically, when the voltage of the first capacitor 500 measured by the voltage sensor 910 is equal to or greater than the predetermined first voltage, the controller 400 may be configured to discharge the voltage of the first capacitor 500 by turning off the relay 900 connecting the energy storage device 100 and the first motor 700, operating the switching element in the first inverter in response to the first current commands 1_Id* and 1_Iq*, and operating the switching element in the second inverter in response to the second current commands 2_Id* and 2_Iq*.

Meanwhile, in a process in which the relay 900 is turned off and the voltage of the first capacitor 500 is discharged as shown in FIG. 4, during driving on a coast or downhill, the voltage of the first capacitor 500 may increase rapidly due to the counter-electromotive force of the first motor 700, whereby the inverter may be damaged due to the resulting overvoltage. Accordingly, it is necessary to suppress the emission of the counter-electromotive force of the motor during driving on a coast or downhill while the voltage of the first capacitor 500 is discharged.

In the present disclosure, during the driving of the first motor 700, a zero vector may be applied to the first motor 700 to generate a negative torque in the first motor 700. Accordingly, it may be possible to prevent the counter-electromotive force of the first motor 700 from emitting by driving the switching element in the first inverter in response to the first current commands 1_Id* and 1_Iq* capable of preventing the counter-electromotive force from being generated in the first motor 700. In addition, it may be possible to enable the voltage of the first capacitor 500 to be discharged by driving the switching element in the second inverter in response to the second current commands 2_Id* and 2_Iq* capable of causing a zero torque to be generated in the second motor 800.

In other words, when the voltage across both ends of the first capacitor 500 measured by the voltage sensor 910 is equal to or greater than the first voltage, the controller 400 may be configured to turn off the relay 900, cause a current provided from the first inverter 200 to the first motor 700 to follow the first current command, and cause a current provided from the second inverter 200 to the second motor 800 to follow the second current command, thereby suppressing the emission of the counter-electromotive force of the motor while discharging the voltage of the first capacitor.

According to another exemplar)/embodiment, when the voltage of the second capacitor 600 measured by the voltage sensor 910 is equal to or greater than the predetermined first voltage, the controller 400 may be configured to turn off the relay connecting the energy storage device 100 and the second motor 800, operate the switching element in the first inverter 200 in response to the second current commands 2_Id* and 2_Iq*, and operate the switching element in the second inverter in response to the first current commands 1_Id* and 1_Iq*.

In summary, when the measured voltage across both ends of the first capacitor 500 is equal to or greater than the first voltage, as shown in FIG. 4, the controller 400 may be configured to turn off the relay 900, cause the current provided from the first inverter 200 to the first motor 700 to follow the first current command and the current provided from the second inverter 300 to the second motor 700 to follow the second current command, or cause the current provided from the first inverter 200 to the first motor 700 to follow the second current command and the current provided from the second inverter 300 to the second motor 800 to follow the first current command, thereby suppressing the emission of the counter-electromotive force of the motor while discharging the voltage of the capacitor which is in overvoltage condition.

Figure 6:
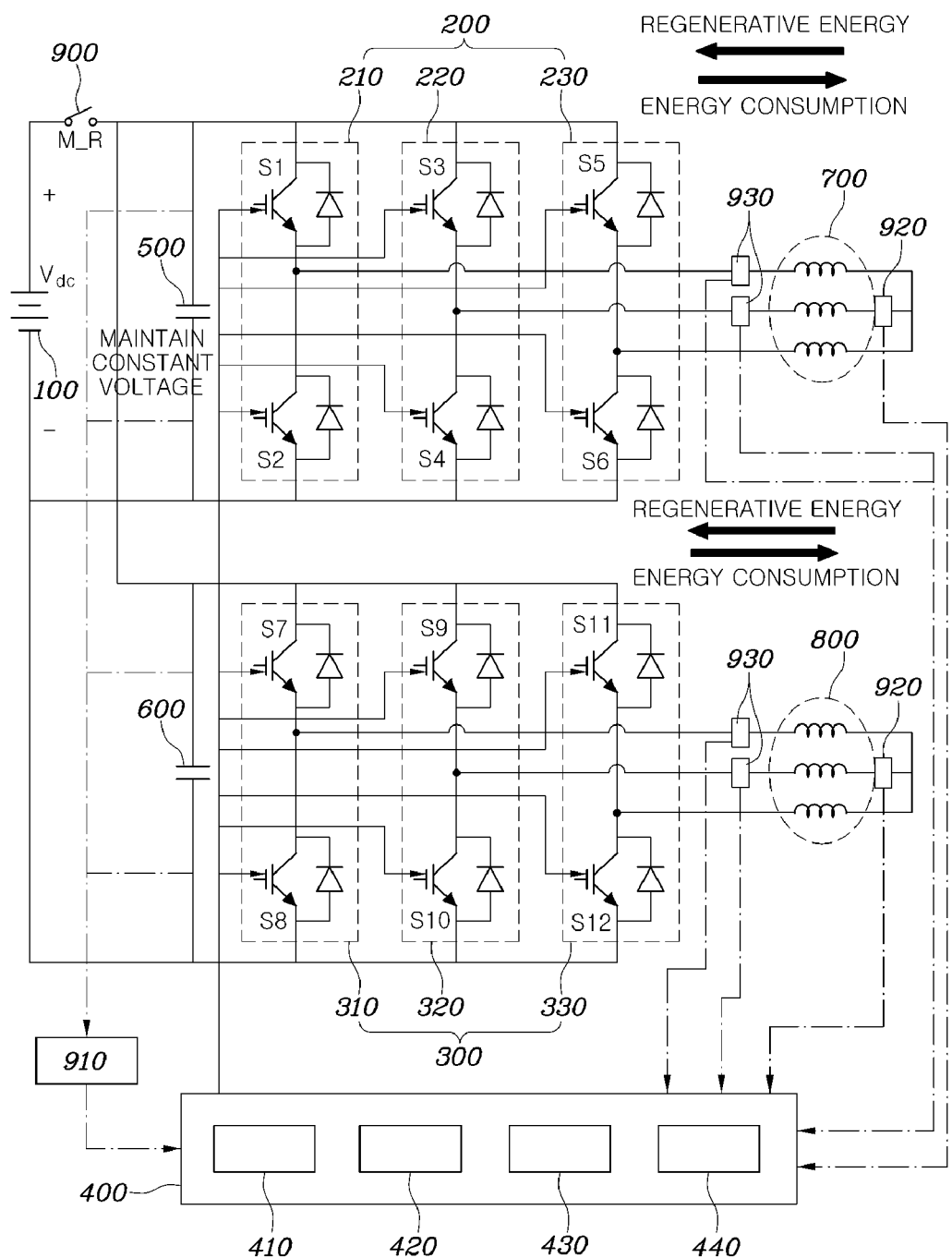
FIG. 6 is a view showing a situation in which a voltage across both ends of a first capacitor is maintained at a constant voltage in a system for protecting an inverter in a vehicle from overvoltage according to an embodiment of the present disclosure.

Meanwhile, when the voltage across both ends of the first capacitor 500 measured by the voltage sensor 910 is equal to or greater than the first voltage, as shown in FIG. 4, the controller 400 may be configured to turn off the relay 900 and cause the current provided from the first inverter 200 to the first motor 700 to follow the first current command and the current provided from the second inverter 300 to the second motor 800 to follow the second current command, thereby discharging the voltage of the first capacitor 500 up to a predetermined second voltage, and allow the voltage of the first capacitor 500 to discharge to the second voltage. Next, the voltage of the first capacitor 500 may be discharged up to the second voltage, and then the controller 400 may be configured to maintain the voltage of the first capacitor 500 within an error range with respect to a second reference voltage as shown in FIG. 6.

Specifically, in response to determining that the measured voltage across both ends of the first capacitor 500 decreases below the error range with respect to the second voltage, the controller 400 may be configured to increase the voltage of the first capacitor 500 through regenerative braking, and in response to determining that the voltage across both ends of the first capacitor 500 exceeds the error range with respect to the second voltage, the controller 400 may be configured to discharge the voltage of the first capacitor 500 through driving of the first motor 700 and the second motor 800, thereby maintaining the voltage of the first capacitor within the error range with respect to the second voltage.

Meanwhile, according to another exemplar)/embodiment, when the voltage of the first capacitor 500 measured by the voltage sensor 910 is equal to or greater than the first voltage, the controller 400 may be configured to turn on the first switching element S1, the third switching element S3, and the fifth switching element S5 while turning off the relay 900 connecting the energy storage device 100 and the first motor 700, or may be configured to operate the switching element in the second inverter in response to the second current command while turning on the second switching element S2, the fourth switching element s4, and the sixth switching element S6.

As described above, in the present disclosure, the controller 400 may be configured to turn on the first switching element S1, the third switching element S3, and the fifth switching element S5 or may be configured to turn on the second switching element S2, the fourth switching element S4, and the sixth switching element S6, so that a zero vector may be applied to the first motor 700 during the driving of the first motor 700 to enable a negative torque to be generated in the first motor 700, thereby preventing the emission of the counter-electromotive force in the first motor 700, and discharging the voltage of the first capacitor 500 by driving the switching element in the second inverter in response to the second current command to enable a zero torque to be generated in the second motor 800.

Conversely, when the voltage of the second capacitor 600 measured by the voltage sensor 910 is equal to or greater than a predetermined first voltage, the controller 400 may be configured to turn on the seventh switching element S7, the ninth switching element S9, and the eleventh switching element s11 or may be configured to turn on the eighth switching element S8, the tenth switching element s10, and the twelfth switching element S12 while turning off the relay 900, and may be configured to operate the switching element in the first inverter 200 in response to the first current command.

Meanwhile, although not shown in detail in the drawings, a plurality of electrical components included in the vehicle may be connected to the energy storage device 100 in a circuit manner, and the electrical components may be driven by receiving power from the energy storage device 100. As shown in FIG. 4, in a situation in which the relay 900 is turned off, the plurality of electrical components has a problem in that a circuit connection with the energy storage device 100 is cut off and thus, power is unable to be supplied thus increasing the risk of a safety accident.

In the present disclosure, in order to solve the above-described problem, in the situation in which the relay is turned off as shown in FIG. 4, the controller 400 may be configured to maintain the voltage of the first capacitor 500 within the error range with respect to the second voltage according to the above-described method while discharging the voltage of the first capacitor 500 up to the second voltage, thereby increasing the driving time of the corresponding electrical components by supplying the energy stored in the first capacitor 500 to the plurality of electrical components in the vehicle, and preventing the occurrence of a safety accident.

Figure 7:
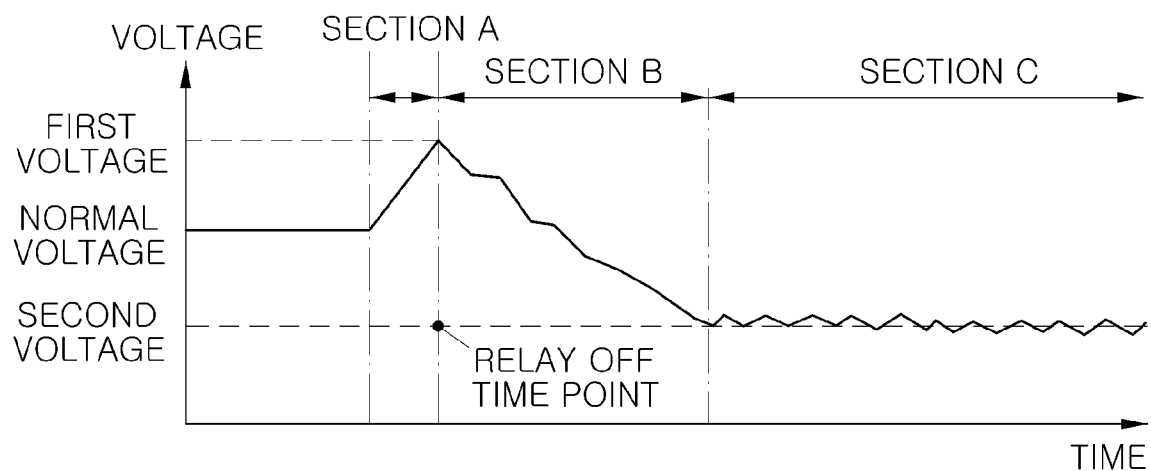
FIG. 7 is a view showing the operation of a system for protecting an inverter in a vehicle from overvoltage according to an exemplary embodiment of the present disclosure.

In the description of the system for protecting an inverter in a vehicle from overvoltage according to an exemplary embodiment of the present disclosure, which is made with reference to FIG. 7, when the voltage of the first capacitor rises and becomes equal to or greater than the first voltage as in section A, the controller may be configured to turn off the relay connecting the energy storage device and the motor, may be configured to drive the first motor by operating the switching element in the first inverter in response to the first current command, and may be configured to drive the second motor by operating the switching element in the second inverter in response to the second current command, thereby discharging the voltage of the first capacitor as in section B. In addition, the controller 400 may be configured to discharge the voltage of the first capacitor, but when the voltage of the first capacitor reaches the second voltage, the controller 400 may be configured to maintain the voltage of the first capacitor within the error range with respect to the second voltage as in section C.

Figure 8:
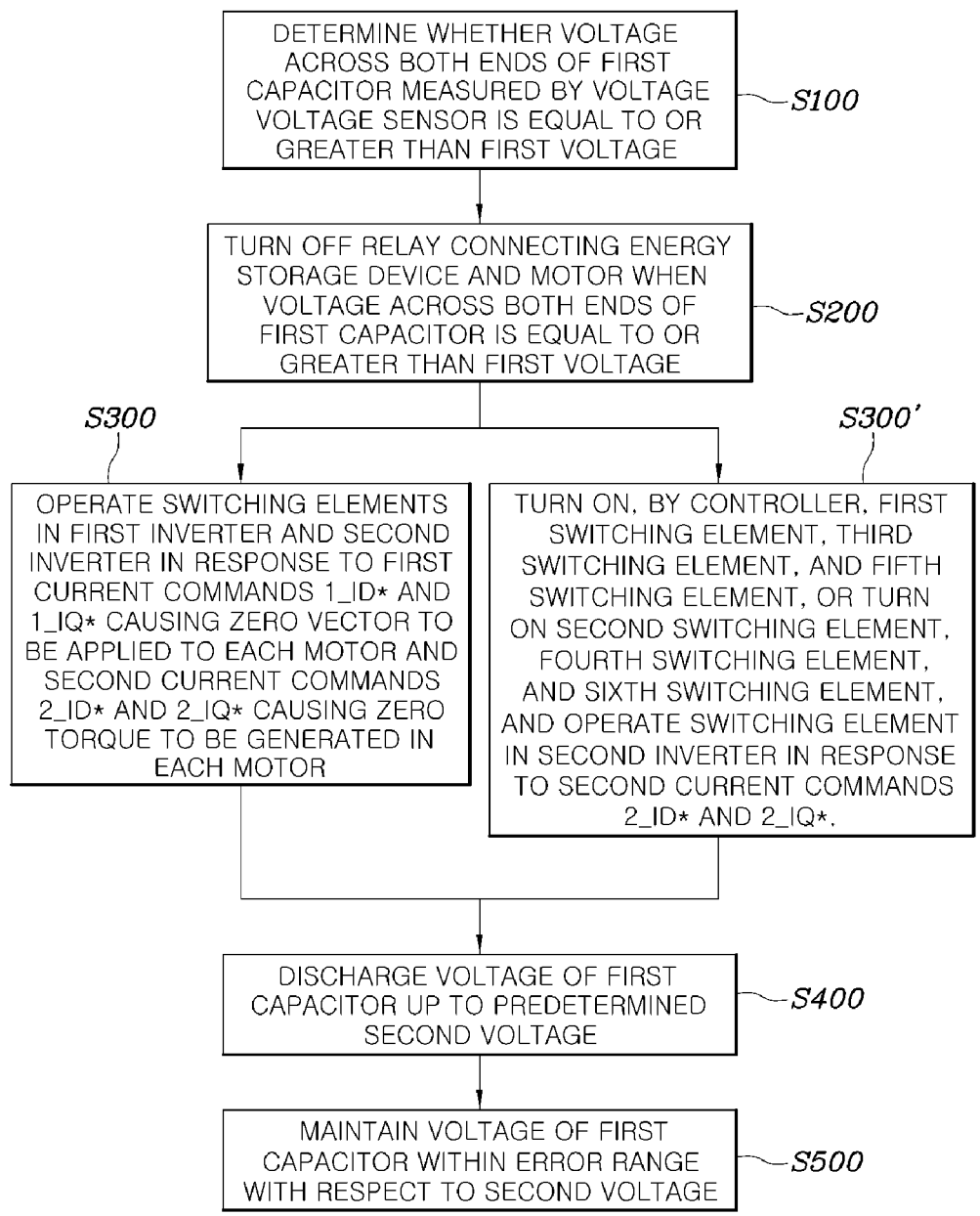
FIG. 8 is a flowchart showing a method of protecting an inverter in a vehicle from overvoltage according to an exemplary embodiment of the present disclosure.
Figure 9:
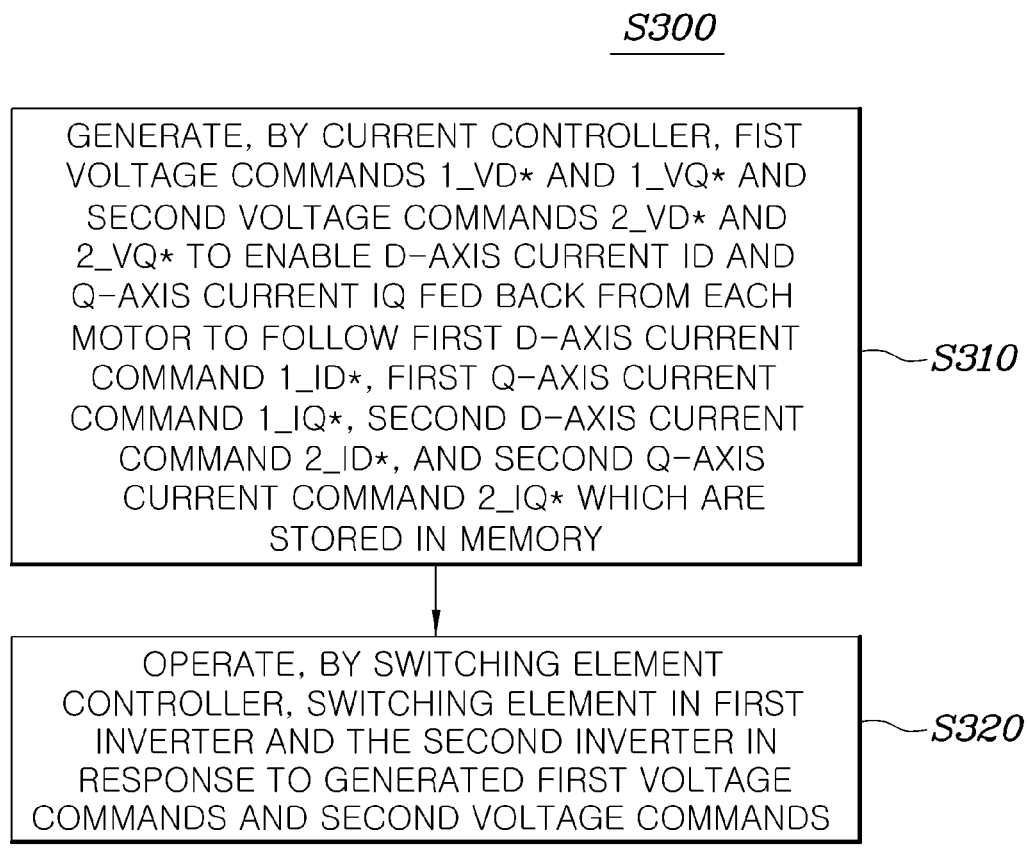
FIG. 9 is a detailed flowchart showing a method for protecting an inverter in a vehicle from overvoltage according to an exemplary embodiment of the present disclosure.

FIG. 8 is a flowchart showing a method of protecting an inverter in a vehicle from overvoltage according to an exemplary embodiment of the present disclosure, and FIG. 9 is a detailed flowchart showing a method for protecting an inverter in a vehicle from overvoltage according to an exemplary embodiment of the present disclosure.

As shown in FIG. 8, a method for protecting an inverter in a vehicle from overvoltage according to an exemplary embodiment of the present disclosure may include: determining whether a voltage across both ends of a first capacitor measured by a voltage sensor is equal to or greater than a first voltage; turning off a relay connecting an energy storage device and a motor when the voltage across both ends of the first capacitor is equal to or greater than the first voltage; and operating switching elements in a first inverter and a second inverter in response to first current commands 1_Id* and 1_Iq* causing a zero vector to be applied to each motor and second current commands 2_Id* and 2_Iq* causing a zero torque to be generated in each motor.

In addition, before the determining of whether the voltage across both ends of the first capacitor measured by the voltage sensor is equal to or greater than the first voltage, the method may further include storing, in a memory, a first current command (1_Id* or 1_Iq*) map causing a zero vector to be applied to each motor and a second current command (2_Id* or 2_Iq*) map causing a zero torque to be generated in each motor.

Meanwhile, the operating of the switching elements in the first inverter and the second inverter in response to the first current commands 1_Id* and 1_Iq* causing the zero vector to be applied to each motor and the second current commands 2_Id* and 2_Iq* causing the zero torque to be generated in each motor may include: generating first voltage commands 1_Vd* and 1_Vq* and second voltage commands 2_Vd* and 2_Vq* for causing a d-axis current Id and a q-axis current Iq fed back from each motor in a current controller to follow a first d-axis current command 1_Id* and a first q-axis current command Iq, a second d-axis current command 2_Id*, and a second q-axis current command which are stored in the memory; and operating the switching elements in the first inverter and the second inverter in response to the generated first voltage command and second voltage command in the switching element controller, as shown in FIG. 9.

Meanwhile, after the turning off of the relay connecting the energy storage device and the motor when the voltage across both ends of the first capacitor is equal to or greater than the first voltage, the method may further include: discharging the voltage of the first capacitor up to a predetermined second voltage; and maintaining the voltage of the first capacitor within an error range with respect to the second voltage.

Specifically, in the maintaining of the voltage of the first capacitor within the error range with respect to the second voltage, the controller may be configured to increase the voltage of the first capacitor through regenerative braking when the voltage across both ends of the first capacitor decreases below the error range with respect to the second voltage, and discharge the voltage of the first capacitor through driving of the first motor and the second motor when the voltage across both ends of the first capacitor exceeds the error range with respect to the second voltage.

Meanwhile, according to another exemplary embodiment, after the turning off of the relay connecting the energy storage device and the motor when the voltage across both ends of the first capacitor is equal to or greater than the first voltage, the method may further include: turning on, by the controller, a first switching element, a third switching element, and a fifth switching element, or turning on a second switching element, a fourth switching element, and a sixth switching element, and operating the switching element in the second inverter in response to the second current commands 2_Id* and 2_Iq*.

Meanwhile, the detailed technical features of each operation of the method for protecting the inverter in the vehicle from the overvoltage are the same as the technical features of the detailed configuration of the system for protecting the inverter in the vehicle from the overvoltage described above, and thus a detailed description thereof will be omitted.

What is claimed is:

1. A system for protecting an inverter in a vehicle from overvoltage, comprising:
a first inverter including a plurality of switching elements and configured to convert energy provided from an energy storage device into alternating current (AC) power;
a first motor configured to be driven by receiving the AC power converted by the first inverter;
a second inverter connected in parallel with the first inverter, including a plurality of switching elements, and configured to convert energy provided from the energy storage device into AC power;
a second motor configured to be driven by receiving the AC power converted by the second inverter;
a first capacitor connected in parallel between the first inverter and the energy storage device and configured to store electric energy of the first motor during regenerative braking; and
a controller configured to turn off a relay connecting the energy storage device and the motors in response to determining that a voltage of the first capacitor measured by a voltage sensor is equal to or greater than a predetermined first voltage and configured to operate the switching elements in the first inverter and the second inverter in response to first current commands 1_Id* and 1_Iq* causing a zero vector to be applied to each motor and second current commands 2_Id* and 2_Iq* causing a zero torque to be generated in each motor, the current commands being previously stored.

2. The system of claim 1, wherein the controller is configured to turn off the relay connecting the energy storage device and the first motor when the voltage of the first capacitor measured by the voltage sensor is equal to or greater than the predetermined first voltage, operate the switching elements in the first inverter in response to the first current commands 1_Id* and 1_Iq*, and operate the switching elements in the second inverter in response to the second current commands 2_Id* and 2_Iq*.

3. The system of claim 1, further comprising:
a second capacitor connected in parallel between the second inverter and the energy storage device and configured to store electric energy of the second motor during regenerative braking,
wherein the controller is configured to turn off the relay connecting the energy storage device and the second motor in response to determining that the voltage of the second capacitor measured by the voltage sensor is equal to or greater than a predetermined first voltage, operate the switching elements in the first inverter in response to the second current commands 2_Id* and 2_Iq*, and operate the switching elements in the second inverter in response to the first current commands 1_Id* and 1_Iq*.

4. The system of claim 3,
wherein the first inverter comprises:
- a first leg including a first switching element and a second switching element positioned at a lower end of the first switching element;
- a second leg including a third switching element and a fourth switching element positioned at a lower end of the third switching element; and
- a third leg including a fifth switching element and a sixth switching element positioned at a lower end of the fifth switching element, and output ends of the first leg, the second leg, and the third leg are connected to each phase of the first motor, and wherein the second inverter comprises:
- a fourth leg including a seventh switching element and an eighth switching element positioned at a lower end of the seventh switching element;
- a fifth leg including a ninth switching element and a tenth switching element positioned at a lower end of the ninth switching element; and
- a sixth leg including an eleventh switching element and a twelfth switching element positioned at a lower end of the eleventh switching element, and output ends of the fourth leg, the fifth leg, and the sixth leg are connected to each phase of the second motor.

5. The system of claim 4, wherein, when the plurality of switching elements are driven, the first current commands $1\_Id^*$ and $1\_Iq^*$ cause the first switching element, the third switching element, and the fifth switching element, or the seventh switching element, the ninth switching element, and the eleventh switching element to be turned on, to apply a zero vector to the first motor or the second motor during driving of the first motor or the second motor and to generate a negative torque in the first motor or the second motor.

6. The system of claim 4, wherein, when the plurality of switching elements in the first inverter or the second inverter are driven, the second current commands $2\_Id^*$ and $2\_Iq^*$ cause a zero torque to be generated in the first motor or the second motor.

7. The system of claim 1, wherein the controller includes:
- a memory configured to store a first current command ($1\_Id^*$ or $1\_Iq^*$) map causing a zero vector to be applied to each motor during driving of each motor to enable a negative torque to be generated in each motor and a second current command ($2\_Id^*$ or $2\_Iq^*$) map causing a zero torque to be generated in each motor;
- an overvoltage detector configured to determine whether a voltage across both ends of each capacitor measured by the voltage sensor is equal to or greater than the first voltage;
- a current controller configured to generate first voltage commands $1\_Vd^*$ and $1\_Vq^*$ and second voltage commands $2\_Vd^*$ and $2\_Vq^*$ to enable a d-axis current Id and a q-axis current Iq fed back from each motor to follow a first d-axis current command $1\_Id^*$, a first q-axis current command $1\_Iq^*$, a second d-axis current command $2\_Id^*$, and a second q-axis current command $2\_Iq^*$ which are stored in the memory; and
- a switching element controller configured to operate the switching elements in the first inverter and the second inverter in response to the generated first voltage commands and second voltage commands.

8. The system of claim 1, wherein, when a measured voltage across both ends of the first capacitor is equal to or greater than the first voltage, the controller is configured to turn off the relay, cause a current provided from the first inverter to the first motor to follow the first current command and a current provided from the second inverter to the second motor to follow the second current command, or cause the current provided from the first inverter to the first motor to follow the second current command and the current provided from the second inverter to the second motor to follow the first current command.

9. The system of claim 1, wherein, when a measured voltage across both ends of the first capacitor is equal to or greater than the first voltage, the controller is configured to turn off the relay, discharge the voltage of the first capacitor up to a predetermined second voltage, and maintain the voltage of the first capacitor within an error range with respect to the second voltage.

10. The system of claim 9, wherein the controller is configured to increase the voltage of the first capacitor through regenerative braking when the measured voltage across both ends of the first capacitor decreases below the error range with respect to the second voltage, and discharge the voltage of the first capacitor through driving of the first motor when the voltage across both ends of the first capacitor exceeds the error range with respect to the second voltage.

11. The system of claim 4, wherein, when the voltage of the first capacitor measured by the voltage sensor is equal to or greater than the predetermined first voltage, the controller is configured to:
- turn on the first switching element, the third switching element, and the fifth switching element, or turn on the second switching element, the fourth switching element, and the sixth switching element while turning off the relay connecting the energy storage device and the first motor, and
- operate the switching elements in the second inverter in response to the second current commands $2\_Id^*$ and $2\_Iq^*$.

12. The system of claim 4, wherein, when the voltage of the second capacitor measured by the voltage sensor is equal to or greater than the predetermined first voltage, the controller is configured to:
- turn on the seventh switching element, the ninth switching element, and the eleventh switching element, or turn on the eighth switching element, the tenth switching element, and the twelfth switching element while turning off the relay connecting the energy storage device and the motor, and
- operate the switching elements in the first inverter in response to the first current commands $1\_Id^*$ and $1\_Iq^*$.

13. A method for protecting an inverter in a vehicle from overvoltage, comprising:
- determining, by a controller, whether a voltage across both ends of a first capacitor measured by a voltage sensor is equal to or greater than a first voltage;
- turning off, by the controller, a relay connecting an energy storage device and a first and second motor in response to determining that the voltage across both ends of the first capacitor is equal to or greater than the first voltage; and
- operating, by the controller, switching elements in a first inverter and a second inverter in response to first current commands $1\_Id^*$ and $1\_Iq^*$ causing a zero vector to be applied to each motor and second current commands $2\_Id^*$ and $2\_Iq^*$ causing a zero torque to be generated in each motor.

14. The method of claim 13, wherein before determining of whether a voltage across both ends of a first capacitor measured by a voltage sensor is equal to or greater than a first voltage, the method includes:

storing in a memory, a first current command (1_Id* or 1_Iq*) map causing a zero vector to be applied to each motor and a second current command (2_Id* or 2_Iq*) map causing a zero torque to be generated in each motor.

15. The method of claim 14, wherein the operating of switching elements in a first inverter and a second inverter in response to first current commands 1_Id* and 1_Iq* causing a zero vector to be applied to each motor and second current commands 2_Id* and 2_Iq* causing a zero torque to be generated in each motor includes:

generating by a current controller, first voltage commands 1_Vd* and 1_Vq* and second voltage commands 2_Vd* and 2_Vq* to enable a d-axis current Id and a q-axis current Iq fed back from each motor to follow a first d-axis current command 1_Id*, a first q-axis current command 1_Iq*, a second d-axis current command 2_Id*, and a second q-axis current command 2_Iq* which are stored in the memory; and operating, by a switching element controller, the switching elements in the first inverter and the second inverter in response to the generated first voltage commands and second voltage commands.

16. The method of claim 13, after turning off of relay connecting an energy storage device and the first and second motor when the voltage across both ends of the first capacitor is equal to or greater than the first voltage, the method includes:

discharging, by the controller, the voltage of the first capacitor up to a predetermined second voltage; and maintaining, by the controller, the voltage of the first capacitor within an error range with respect to the second voltage.

17. The method of claim 16, wherein, in the maintaining of the voltage of the first capacitor within an error range with respect to the second voltage, the method includes:

increasing, by the controller, the voltage of the first capacitor through regenerative braking when the voltage across both ends of the first capacitor decreases below the error range with respect to the second voltage; and discharging, by the controller, the voltage of the first capacitor through driving of the first motor and the second motor when the voltage across both ends of the first capacitor exceeds the error range with respect to the second voltage.

18. The method of claim 13, after turning off of the relay connecting an energy storage device and the first and second motor when the voltage across both ends of the first capacitor is equal to or greater than the first voltage, the method includes:

turning on, by the controller, a first switching element, a third switching element, and a fifth switching element, or turning on a second switching element, a fourth switching element, and a sixth switching element; and operating, by the controller, the switching elements in the second inverter in response to the second current commands 2_Id* and 2_Iq*.

* * * * *